United States Patent [19]
Farmery

[11] 3,982,672
[45] Sept. 28, 1976

[54] APPLICATORS OF GRANULAR MATERIALS

[76] Inventor: Horstine Farmery, North Newbald, York, England

[22] Filed: June 11, 1975

[21] Appl. No.: 585,746

[30] Foreign Application Priority Data
June 14, 1974 United Kingdom............... 26431/74

[52] U.S. Cl................................ 222/274; 222/348
[51] Int. Cl.²......................................... G01F 11/00
[58] Field of Search ........... 222/368, 348, 366, 273, 222/274

[56] References Cited
UNITED STATES PATENTS
| | | | |
|---|---|---|---|
| 2,899,111 | 8/1959 | Christensen | 222/368 |
| 3,606,965 | 9/1971 | Cortelyou et al. | 222/368 X |

FOREIGN PATENTS OR APPLICATIONS
| | | | |
|---|---|---|---|
| 1,254,817 | 1/1961 | France | 222/368 |
| 451,562 | 8/1936 | United Kingdom | 222/368 X |
| 817,328 | 7/1959 | United Kingdom | 222/368 |

*Primary Examiner*—Allen N. Knowles
*Assistant Examiner*—Hadd S. Lane
*Attorney, Agent, or Firm*—Bacon & Thomas

[57] ABSTRACT

A machine, for delivery of metered quantities of granular material, comprising a hopper, a discharge outlet, and a metering device in the lower regions of the hopper for conveying measured quantities of granular material between said hopper and said discharge outlet, said metering device comprising a rotary member with peripheral flutes defining peripheral recesses in said member which recesses are, when the member is rotated, successively charged with granular contents from said hopper, peripherally closed by an internal surface of said hopper, and open at the discharge outlet to permit discharge of the conveyed material, characterized in that said recesses are closed by a wear member after exposure to the hopper contents and before closure by said hopper surface.

6 Claims, 4 Drawing Figures

APPLICATORS OF GRANULAR MATERIALS

This invention relates to machines for distributing metered quantities of granular material and has particular application to machines for distributing granular material on the ground, which machines are commonly called applicators.

A successful applicator is described in the Specification of U.S. Pat. No. 902,594 which has a metering and feeding mechanism comprising at least one fluted member capable of being made fast to a driving shaft and located between annular members made fast to the tubular part of the hopper. As the fluted member(s) rotate, the non-rotating annular members effectively close the ends thereof and prevent spillage of the powder or granular material. There may be two fluted members with a smooth surface non-rotatable spacing member therebetween to make up the distance between the inner ends of said nonrotatable annular mebers and the two fluted members may feed to two separate delivery discharge tubes or outlets.

In a preferred form of such applicator the driving shaft has a square or other flat face cross-sectional shape matching the shape of the central apertures in the fluted members, a cylindrical distance member with a circular central aperture is located on the shaft between the fluted members and is prevented from rotating, and the end closure annular members each comprise a bush through which the shaft is a sliding fit. The shaft is rotatable in a bearing shell capable of being made fast to and closing off the part of the hopper in which the material metering mechanism rotates.

The one or more fluted members, rotated relative to the end closure annular/members and the intermediate cylindrical distance piece in the hopper lower end part, have their peripheral recesses successively charged with granules from the hopper, peripherally closed by an internal surface in the hopper lower part whilst conveying the granules to the outlet or outlets, and exposed to allow the granules to drop out, under gravity, through the one or more discharges. However, granules only partly entered in a peripheral recess of a rotary member are trapped between the trailing flute, defining the trailing edge of a recess, and the edge of the said internal surface and said granules not only cause erosion of the flutes and the hopper end part, usually in the form of metallic casting, so that the parts requires replacement but, upon break down of the granules create sharp edge particles which again affect the mechanical parts and cause undesirable dust.

The replacement of such hopper lower end part and said fluted members is expensive in the cost of the part and in the labour involved in its removal and replacement, and the object of the present invention is to provide an applicator of the kind set forth above in which erosion of the hopper end part is substantially reduced and a better or smoother discharge of the granular material results.

According to the present invention there is provided a machine, for delivery of metered quantities of granular material, comprising a hopper, a discharge outlet and a metering device in the lower regions of the hopper for conveying measured quantities of granular material between said hopper and said discharge outlet, said metering device comprising a rotary member with peripheral flutes defining peripheral recesses in said member which recesses are, when the member is rotated, successively charge with granular contents from said hopper, peripherally closed by an internal surface of said hopper, and open at the discharge outlet to permit discharge of the conveyed material, characterised in that said recesses are closed by a wear member after exposure to the hopper contents and before closure by said hopper surface.

Preferably the wear member is detachably secured in a fixed position relative to the rotational axis for the rotary member.

Preferably the wear member acts as a plough or doctor member on the charge recesses and, conveniently, the wear member extends from an edge region, contiguous with the internal surface of the hopper closing the body recesses, around the peripheral path of the rotary body to reduce the angle of exposure of each recess to the hopper contents.

The rotational axis of the rotary member is, when the machine is operating, preferably horizontal and the wear member conveniently extends from said edge region to substantially the highest point of the rotary member.

Preferably also, the wear member extends from said edge region adjacent the hopper surface to an edge region parallel with the rotational axis for the body.

The metering device may conveniently comprise a plurality of rotary bodies, each having granular material conveying recesses therein, arranged for rotation about a common axis and a single wear member can extend parallel to said common axis to effectively close each recess in each rotary member before that recess is closed by the associated internal hopper surface, A non-rotatable member is located adjacent each side face of each rotary member to effectively close the ends of the peripheral recesses in that rotary member, and each said non-rotatable member has an external diameter substantially equal to the diameter of the path swept by the tips of the flutes on the rotary member, whereby said wear member may be arranged to contact the external diameter of said non-rotatable members.

The straight edge of the steel plate may be situated close to a tangent to the fluted wheel or wheels, which is preferably horizontal, and at the uppermost point of such wheels when in a position of use. Such edge is therefore nearer the mid position of the upper portin of the fluted wheel then the normal cutoff edge of the hopper lower end part so providing smoother collection and less "boiling" or agitation in the granular material.

In one form the wear member is shaped with its trailing edge, in the direction of rotation of the rotary members, curved to match the shape of the hopper lower end part adjacent the peripheries of the rotatable and non-rotatable parts. The plate is positioned with such curved edge abutting the surface of the hopper part with its straight edge parallel to the rotation axis and is secured by a holding screw engaging an intermediate cylindrical member and/or each of the end members.

The straight edge not only improves the action but it is, due to the nature of the material plate, conveniently steel, more resistant to wear. Should wear or damage occur the plate may be simply and inexpensively replaced.

In another form the wear member comprises a curved steel plate of parallelogram shape with opposed straight edges and its trailing regions are accommodated in a recess formed in the curved internal surface of the hopper lower end part to locate its leading straight edge in the required exposed operative position.

The plate may be secured in its recess by a holding screw or screws. As the plate has a uniform curvature and its leading edge is parallel with its trailing edge said plate may, after the leading edge has become worn in the region of the rotary members, be rotated through 180° to reverse the leading and trailing edges thereby to present a new leading edge.

In a preferred embodiment in accordance with the invention the, or each, said rotary member comprises a metallic core having a substantially central bore, by which the rotary member is mounted on a drive shaft, with its external surfaces coated with a plastics material and the granular metering recesses in said member defined by circumferentially spaced peripheral recesses in the plastics coating.

The plastics material preferably comprises polyurethene.

In order that the invention may be clearly understood and readily carried into effect two embodiments of curved steel plate and their application are by way of example hereinafter more fully described and illustrated in the drawings accompanying the provisional specification in which.

Figure 1:
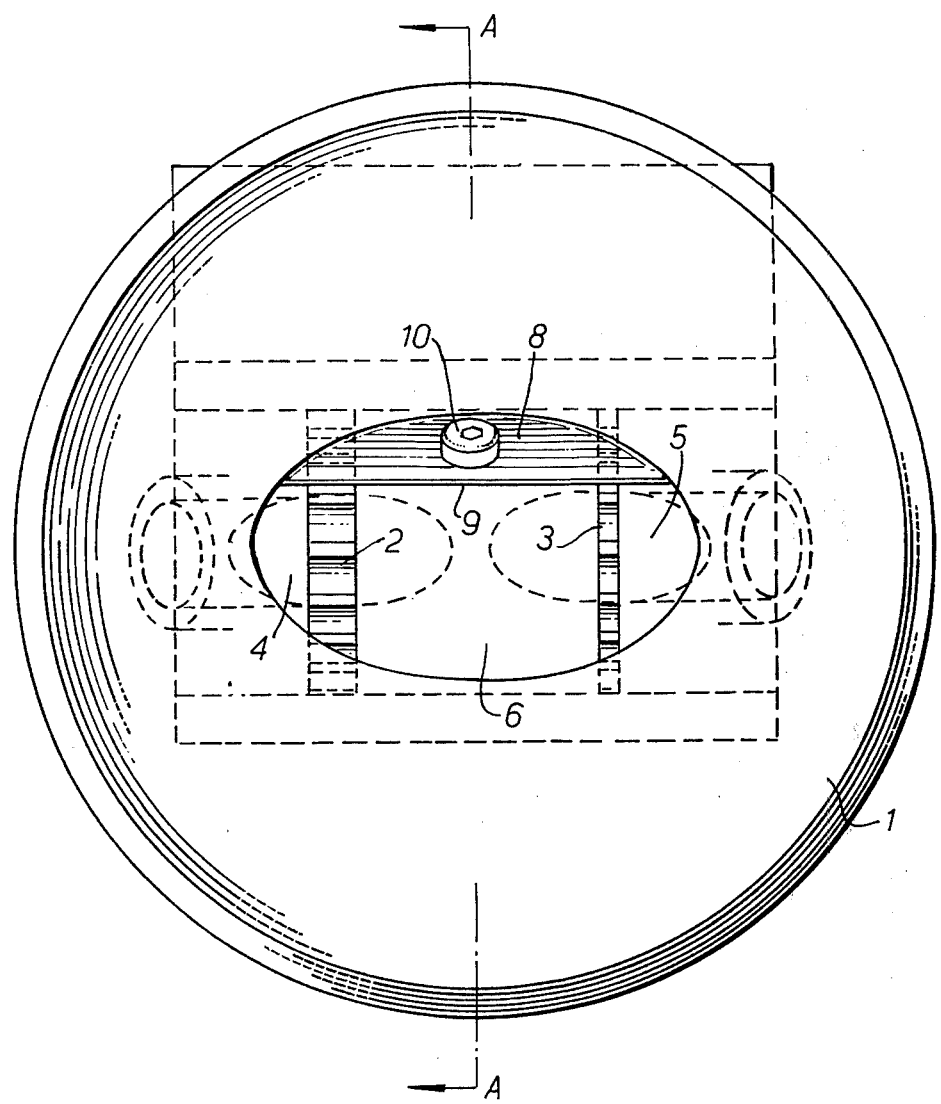
FIG. 1 is a plan view of a known form of hopper lower end casting in which the metering wheels rotate showing one embodiment of a wear member located in operative position.

The hopper lower end casting 1 is of known form with a metering mechanism comprising, in the illustrated embodiment, two fluted metering wheels 2, 3 between non-rotatable annular end members 4, 5 and with non-rotatable cylindrical spacing member 6 between said wheels. The wheels 2 and 3 are secured for rotation with a driving shaft 7 and members 4, 5 and 6 are rotatable relative to shaft 7.

Figure 2:
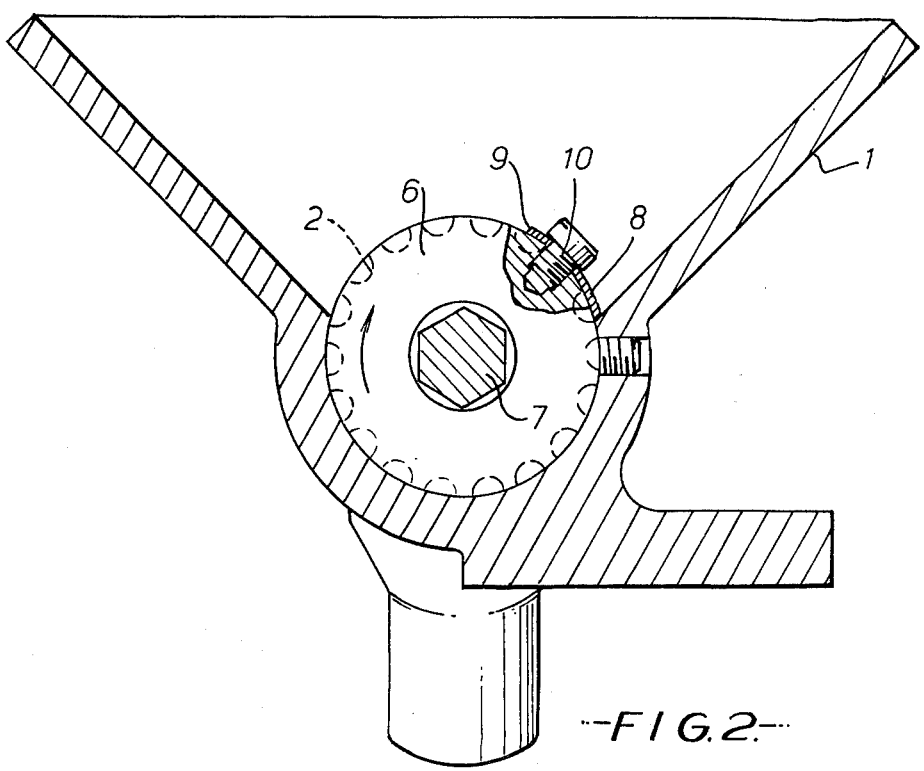
FIG. 2 is a section on the line A—A of FIG. 1.

As shown in FIGS. 1 and 2 the wear member comprises a curved plate 8 conveniently a steel plate with a straight edge 9 and the shape of the rest of its periphery curved to match the throat of the casting 1 adjacent the metering mechanism. The plate 8 is placed to abut the end members 4, 5 and the intermediate member 6 and is secured to the latter by at least one holding screw 10 so that its straight edge 9 is parallel to the rotation axis of the driving shaft 7.

As the metering wheels 2, 3 rotate in the direction of the arrow shown in FIG. 2 the peripheral recesses between the flutes are exposed to the granular contents of the hopper and are charged with granules, the charged recesses pass beneath the leading edge of the plate 8 aand said leading edge effectively holds back, ploughs, or doctors the granules peripherally outwardly of the recesses but frictionally conveyed with the metering wheels 2,3. Further, any granule partially in and partially out of a recess and trapped between a metering wheel 2 or 3 and the wear plate 8 will erode the wear plate 8 and be packed down into the recess, deflected from the recess, or broken so that the said damaging granules are rendered harmless before the recesses convey the granular contents into contact with the internal surface of the hopper lower end. Wearing away of such casting is thus avoided and should wear occur on the straight edge 9 the plate 8 may inexpensively be replaced. The plate 8 may also be used on applicators where wear has occurred and thereby save the cost of replacing its casting, it only being necessary to seal the curved edge of plate to the throat of the casting to prevent passage of fines of the granular material.

Figure 3:
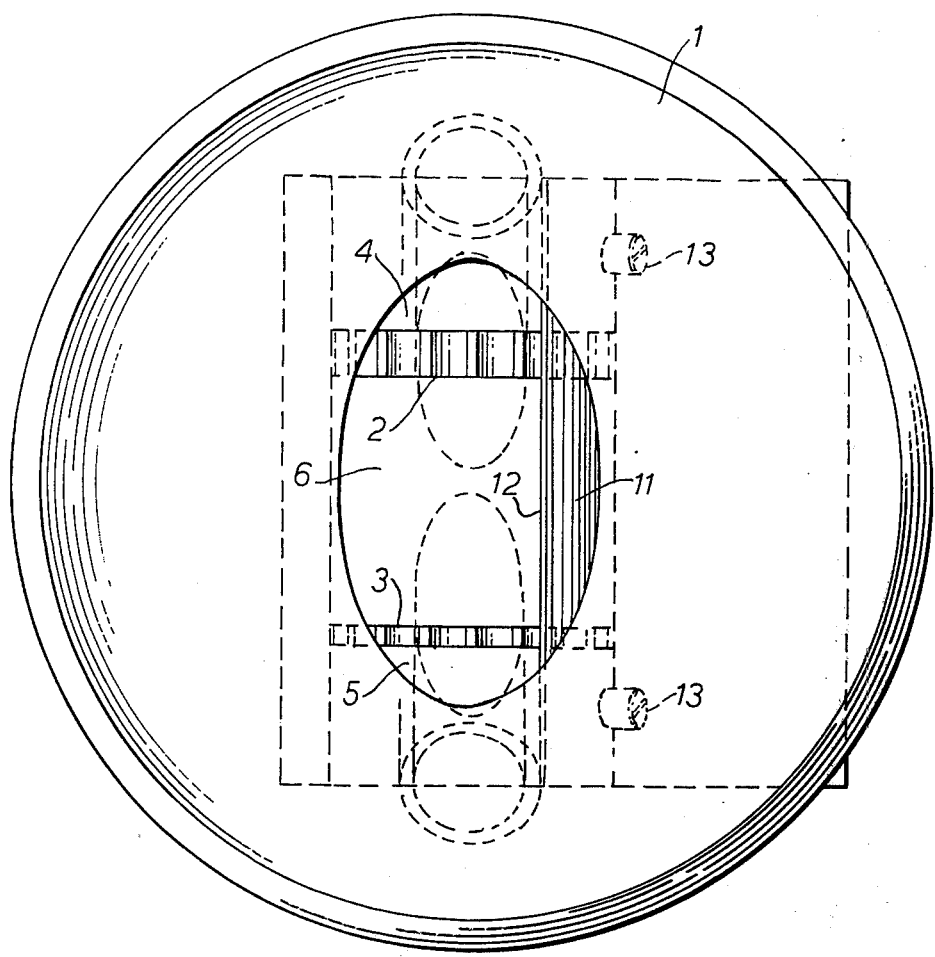
FIG. 3, is also a plan view of the know form of hopper lower end casting provided with another embodiment of a wear member
Figure 4:
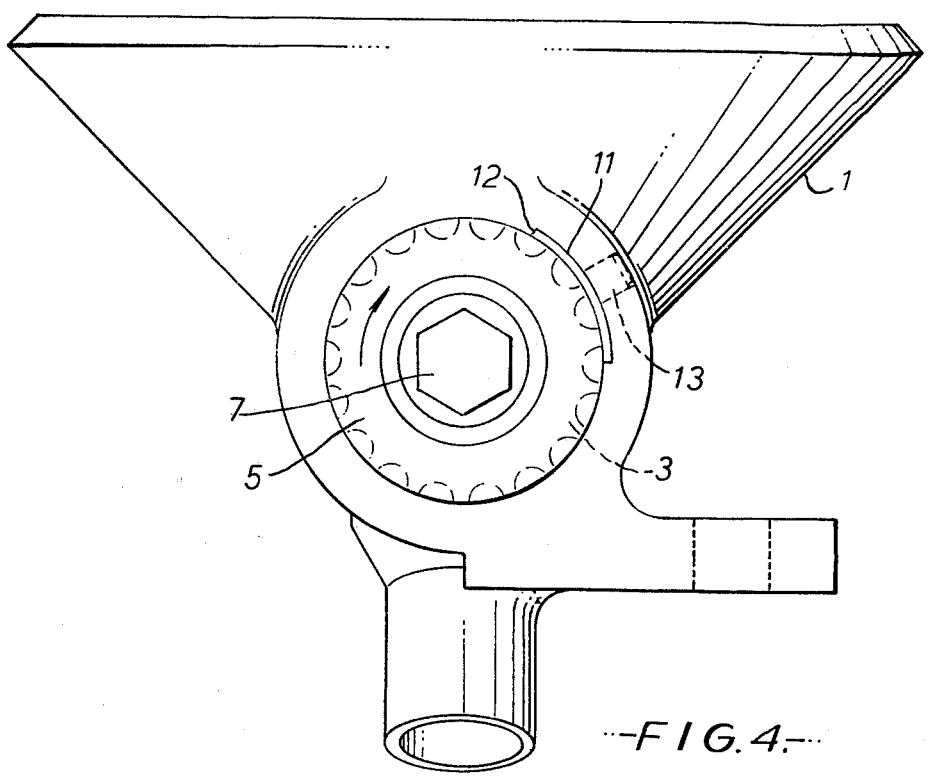
FIG. 4 is an elevation, being a view from below FIG. 3.

In FIGS. 3 and 4 a like hopper lower end casting is illustrated which is provided with a modified form of wear member comprising a curved steel plate 11 with a straight edge 12 an opposite corresponding edge, and parallel end edges. Such plate 11 is accommodated in a recess of the bore in the casting in which the metering mechanism is located and it is held in place, as by two holding screws 12, with its straight edge 11 in operative position parallel to the rotation axis. Should any wear occur of the edge 12, the plate 11 may be inexpensively replaced or it may be extracted and then repositioned with its other longer edge as the effective straight edge.

In a preferred embodiment the fluted metering wheels each comprise a rigid core coated on its external surfaces with a plastic material and with the flutes formed wholly of plastics material. Such construction may conveniently include a metallic core and has been found to have lower jamming characteristics than conventional metal metering wheels.

What is claimed is:

1. In a machine, for delivery of metered quantities of granular material, comprising a hopper, a discharge outlet, and a metering device in the lower regions of the hopper for conveying measured quantities of granular material between said hopper and said discharge outlet, said metering device comprising a cylindrical rotary member with peripheral flutes defining peripheral recesses in said member which recesses are, when the member is rotated, successively charged with granular contents from said hopper, peripherally closed by an internal surface of said hopper, and open at the discharge outlet to permit discharge of the conveyed material, the improvement comprising: non rotatable cylindrical members at the ends of said rotary member and closing the ends of said recesses, a wear member in the form of a cylindrically arcuate plate overlying a portion of the periphery of said rotary member at one side of and extending to said hopper and overlying adjacent portions of said non rotatable members, and means releasably securing said wear member to at least one of said non rotatable members.

2. A machine as claimed in claim 1 in which the wear member extends from said adjacent the hopper surface to an edge region parallel with the rotational axis for the body.

3. A machine as claimed in claim 1 in which the metering device comprises a plurality of rotary bodies, each having granular material conveying recesses therein, arranged for rotation about a common axis, a non rotatable member therebetween, and wherein a single wear member extends parallel to said common axis to effectively close each recess in each rotary member before that recess is closed by the associated internal hopper surface.

4. A machine as claimed in claim 1 in which the wear member has the form of a parallelogram whereby it is reversible.

5. A machine as claimed in claim 1 in which said rotary member comprises a rigid core having a substantially central bore by which the rotary member is mounted on a drive shaft, with the external surfaces of the rigid core coated with a plastics material and the granular material recesses in said member defined by circumferentially spaced peripheral recesses in the plastics coating.

6. A machine as claimed in claim 5 in which the plastics material comprises polyurethane.

* * * * *